(12) United States Patent
Ogawa

(10) Patent No.: US 6,195,143 B1
(45) Date of Patent: Feb. 27, 2001

(54) LIQUID CRYSTAL PANEL STRUCTURE WITH MICRO-LENS ARRAY AND PROJECTOR USING THE MICRO-LENS ARRAY

(75) Inventor: Yasunori Ogawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/332,441

(22) Filed: Jun. 14, 1999

(30) Foreign Application Priority Data

Jun. 16, 1998 (JP) .................................................. 10-186898
Feb. 3, 1999 (JP) .................................................. 11-025860

(51) Int. Cl.[7] ........................... G02F 1/1335; G03B 21/26
(52) U.S. Cl. ................................... 349/95; 349/5; 349/11; 353/34
(58) Field of Search ............................... 349/95, 5, 8, 11; 353/82, 34

(56) References Cited

U.S. PATENT DOCUMENTS

| 5,493,427 | | 2/1996 | Nomura et al. ...................... 359/40 |
| 5,548,349 | * | 8/1996 | Mizuguchi et al. .................. 348/766 |
| 5,633,737 | * | 5/1997 | Tanaka et al. ...................... 349/95 |
| 5,666,176 | * | 9/1997 | Kurematsu ......................... 349/95 |
| 5,726,719 | * | 3/1998 | Tanaka et al. ...................... 349/8 |
| 5,760,850 | * | 6/1998 | Nakanishi et al. .................. 349/5 |
| 5,764,318 | * | 6/1998 | Kurematsu et al. .................. 349/5 |
| 5,990,992 | * | 11/1999 | Hamanaka et al. .................. 349/95 |
| 6,002,459 | * | 12/1999 | Kaise et al. ........................ 349/95 |
| 6,031,591 | * | 2/2000 | Hamanaka ......................... 349/95 |
| 6,104,458 | * | 8/2000 | Fukuda ............................. 349/95 |

FOREIGN PATENT DOCUMENTS

| 0 802 685 | 10/1997 | (EP) . |
| 2-257119 | 10/1990 | (JP) . |

* cited by examiner

Primary Examiner—William L. Sikes
Assistant Examiner—Tarifur R. Chowdhury
(74) Attorney, Agent, or Firm—Oblon, Spivak, McClelland, Maier & Neustadt, P.C.

(57) ABSTRACT

A liquid crystal device that modulates light in accordance with supplied image information comprises a plurality of pixels arranged in a matrix, each pixel having an opening to allow passage of light, and an array of micro-lenses arranged in a matrix that divides illumination light into a plurality of partial light beams and converges the light beams to a light incidence plane of the pixels. In the liquid crystal device, the characteristics of the micro-lenses are adjusted to increase a proportion of light exiting from the opening of each pixel substantially parallel to a clear viewing direction of the liquid crystal device compared to a proportion of light parallel to other directions. Each micro-lens is positioned so that a line connecting the optical center of the micro-lens to the center of the incident surface of the corresponding pixel is substantially parallel to the clear viewing direction.

20 Claims, 15 Drawing Sheets

Fig.11(A-1)
G CONTRAST
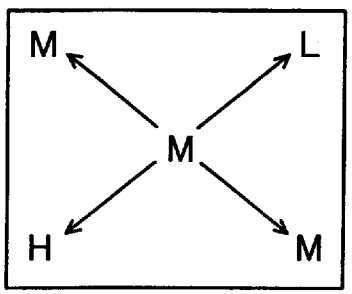
Fig.11(A-2)
R, B CONTRAST
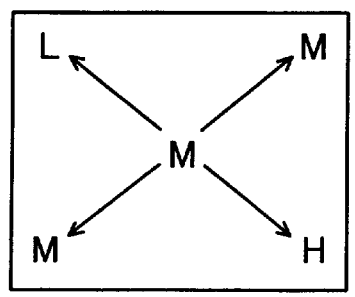
H: HIGH, M: MEDIUM, L: LOW
CONTRAST: L＜ML＜M＜MH＜H
Fig.11(B-1)
G BRIGHTNESS
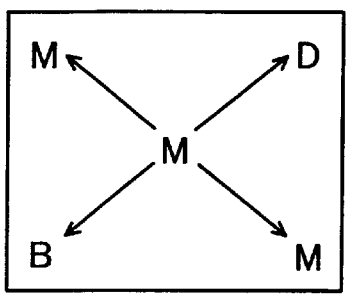
Fig.11(B-2)
R, B BRIGHTNESS
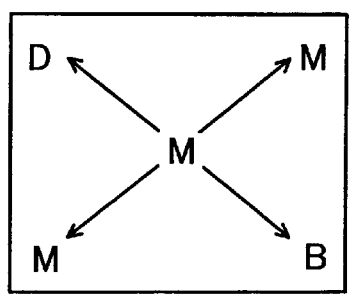
B: BRIGHT, M: MEDIUM, D: DARK
BRIGHTNESS: D＜MD＜M＜MB＜B

Fig.12(A-1)
G CONTRAST
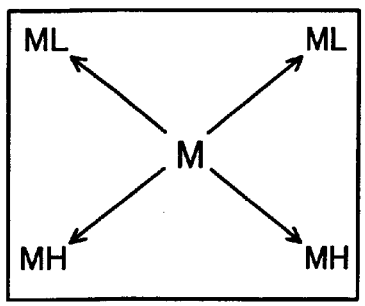
Fig.12(A-2)
R, B CONTRAST
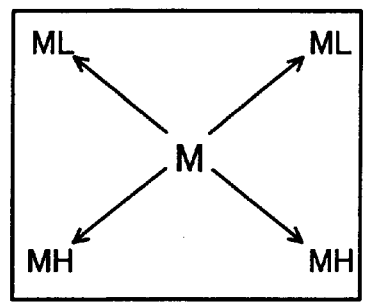
H: HIGH, M: MEDIUM, L: LOW
CONTRAST: L<ML<M<MH<H
Fig.12(B-1)
G BRIGHTNESS
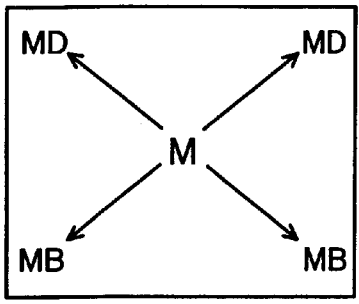
Fig.12(B-2)
R, B BRIGHTNESS
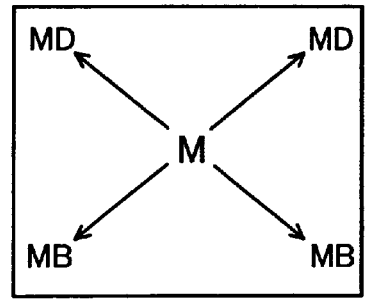
B: BRIGHT, M: MEDIUM, D: DARK
BRIGHTNESS: D<MD<M<MB<B

LIQUID CRYSTAL PANEL STRUCTURE WITH MICRO-LENS ARRAY AND PROJECTOR USING THE MICRO-LENS ARRAY

BACKGROUND OF THE INVENTION

1. Field of the Invention

This invention relates to a liquid crystal device that modulates light in accordance with supplied image information, and to a projection display apparatus that uses the liquid crystal device.

2. Description of the Related Art

Liquid crystal apparatuses (liquid crystal panels) that modulate light in accordance with supplied image information are widely utilized as direct view display apparatuses and as light valves (light modulators) of projection display apparatuses. FIG. 14 is an exploded view showing the general configuration of a conventional liquid crystal device 1000. The liquid crystal device 1000 is equipped with a liquid crystal cell 1020, a micro-lens array 1030 and two polarizers 1040 and 1050. The liquid crystal cell 1020 has a transparent substrate 1021, an opposed (transparent) substrate 1025 and a liquid crystal layer 1027 set between the transparent substrate 1021 and the opposed substrate 1025. A thin-film transistor 1022 and pixel electrode 1023 are provided on the transparent substrate 1021 for each pixel. A common electrode 1024 is provided on the opposed substrate 1025. A light shield layer 1026 is provided between the opposed substrate 1025 and the common electrode 1024. The light shield layer 1026 has a corresponding opening 1026W for each pixel electrode 1023.

The micro-lens array 1030 is provided on the opposite side of the opposed substrate 1025 to the liquid crystal layer 1027. The micro-lens array 1030 is constituted of a plurality of concentrically shaped micro-lenses 1030M. As shown by FIG. 15, the micro-lenses 1030M are arranged so that the optical axis of each of the micro-lenses 1030M is substantially in alignment with the center axis of the corresponding opening 1026W.

The first polarizer 1040 is provided on the opposite side of the micro-lens array 1030 to the opposed substrate 1025, and the second polarizer 1050 is provided on the opposite side of the liquid crystal cell 1020 to the liquid crystal layer 1027.

In this liquid crystal device 1000, light enters the liquid crystal layer 1027 via the opposed substrate 1025 and exits via the transparent substrate 1021 (the exit surface being the display surface).

The passage of incident light through the liquid crystal device 1000 is illustrated by FIG. 15. The incident light is split into a plurality of beams and is converged by its passage through each of the micro-lenses 1030M of the micro-lens array 1030, and then enters the opening 1026W of the corresponding pixel, from which it passes through the common electrode 1024 and pixel electrode 1023 and exits from the display surface. The light is caused to form an image on the display surface by using the application of a voltage (determined by the image information) between the common electrode 1024 and each pixel electrode 1023 to control (modulate) the light transmissivity of each pixel. In a projection display apparatus that uses this type of liquid crystal device, the image displayed on the liquid crystal device is projected by an optical projection system (such as a projection lens) to be displayed on a screen.

A characteristic of a liquid crystal device is that it changes the contrast of the image displayed on the display surface in the direction in which the image is viewed. Here, the direction in which the image is viewed is termed the viewing angle or viewing angle direction, and is expressed as the angle from the normal of the display surface and the plane angle. Each type of liquid crystal device also has a viewing angle direction (hereinafter referred to as "clear viewing direction") at which contrast is at a maximum (hereinafter referred to as "optimum contrast"). The arrow in FIG. 15 indicates the clear viewing direction VD of the liquid crystal device 1000. Thus, the contrast of the viewed image is best when the light from the display surface of the liquid crystal device exits in a direction that is substantially parallel to the clear viewing direction VD, and when the light exits in a direction that is not parallel to the clear viewing direction VD the contrast is degraded by an amount that is dependent on the direction of the light and increases with the increase in the angle by which the light departs from being parallel with the clear viewing direction VD.

For illumination liquid crystal devices generally employ divergent or substantially parallel light, and light emitted by the display surface includes light with the various directional components. Although it is termed substantially parallel light, the fact is that it includes quite a high proportion of non-parallel components. Therefore, since the contrast of a liquid crystal device is determined by light thus comprised of these various directional components, the contrast of the liquid crystal device is degraded compared to the optimum contrast in the clear viewing direction.

In order for a viewer to obtain a good understanding of images displayed on a liquid crystal device, it is preferable to have good image contrast, a large brightness differential between light display (white screen display) and dark display (black screen display). That is, it is preferable for there to be a large difference between light transmissivity during light display and light transmissivity during dark display. However, the problem with conventional liquid crystal devices is that, as described, owing to the fact that the light consists of various directional components images can be viewed only at a contrast that is degraded compared to the optimum contrast.

SUMMARY OF THE INVENTION

An object of the present invention is to provide a liquid crystal device having improved contrast of displayed images compared to that of a conventional liquid crystal device.

At least part of the above and the other related object are attained by a first liquid crystal device that modulates light in accordance with supplied image information, comprising: a plurality of pixels arranged in a matrix, each pixel having an opening to allow passage of light; and a micro-lens array that has a plurality of micro-lenses arranged in a matrix that divides illumination light into a plurality of partial light beams and converges the light to a light incidence plane of the pixels. Characteristics of micro-lenses are adjusted to increase a proportion of light exiting from the opening of each pixel substantially parallel to a clear viewing direction of the liquid crystal device compared to a proportion of light parallel to other directions.

Here, "clear viewing direction" refers to the viewing angle direction at which contrast is at a maximum (optimum contrast). Also, "adjusting micro-lens characteristics" refers to modification of the shape, refractive index or position of micro-lenses.

In accordance with the above configuration, the proportion of light emitted from the pixel openings that is comprised of light that is substantially parallel to the clear viewing direction of the liquid crystal device can be increased, improving the contrast compared to that of a conventional liquid crystal device.

In accordance with one preferable structure of the first liquid crystal device, the micro-lenses are formed as concentric lenses and are each positioned so that an optical center thereof is offset from a center axis of each pixel to increase a proportion of light exiting from the opening of each pixel substantially parallel to the clear viewing direction of the liquid crystal device compared to the proportion of light parallel to the other directions.

Here, "optical center" corresponds to the optical axis of concentric lenses, a position along which incident light proceeds without refraction.

In accordance with the above configuration, of the light exiting the micro-lenses, light that is substantially parallel to the clear viewing direction passes through the pixels and is emitted in a direction substantially parallel to the clear viewing direction. On the other hand, part of the light going in a different direction does not pass through the pixel openings and is not emitted from the pixels. Thus, it is possible to increase the proportion of light emitted from the liquid crystal device that is substantially parallel to the clear viewing direction, and as a result, contrast can be improved compared to that of a conventional liquid crystal device.

In this configuration, it is preferable that a position of the optical center of each micro-lens is set so that a line connecting the optical center of each micro-lens with the center of the opening of each pixel is substantially parallel to the clear viewing direction.

In accordance with the above configuration, of the light exiting the micro-lenses, light that is substantially parallel to the clear viewing direction can be converged and made to enter substantially the center of each pixel opening. This makes it possible to make the most effective use of light that is parallel to the clear viewing direction.

In accordance with another preferable structure of the first liquid crystal device, each micro-lens is formed so that a geographical center of the micro-lens is offset from an optical center of the micro-lens to increase the proportion of light exiting from the opening of each pixel substantially parallel to the clear viewing direction of the liquid crystal device compared to the proportion of light parallel to the other directions.

In accordance with the above configuration, of the light exiting the micro-lenses, light that is deflected in a direction substantially parallel to the clear viewing direction passes through the pixels and is emitted in a direction that is substantially parallel to the clear viewing direction. On the other hand, part of the light going in a different direction does not pass through the pixel openings and is not emitted from the pixels. Thus, it is possible to increase the proportion of light emitted from the liquid crystal device that is substantially parallel to the clear viewing direction, and as a result, contrast can be improved compared to that of a conventional liquid crystal device.

In this configuration, it is preferable that the optical center of each micro-lens is offset from the geographical center of the micro-lens to increase the proportion of light exiting from the opening of each pixel substantially parallel to the clear viewing direction of the liquid crystal device compared to the proportion of light parallel to the other directions.

The above configuration makes it possible to align the center axis of the light entering the micro-lenses that has the highest intensity (quantity of light) so that it is directed substantially parallel to the clear viewing direction. As a result, the beams of light exiting the micro-lenses all exit parallel to the clear viewing direction, with each passing substantially through the center of the corresponding pixel, that is, substantially through the center of each opening. Thus, there is little reduction in the amount of illumination light that enters the liquid crystal device, meaning there is little reduction in the brightness of the displayed image, enabling contrast to be improved.

The optical center of the micro-lens may be also located on a center axis of the corresponding pixel of the micro-lens.

In accordance with the above configuration, when illumination light that is substantially parallel enters the liquid crystal device substantially perpendicular to the plane of incidence, there is little reduction in the amount of illumination light that enters the liquid crystal device, meaning there is little reduction in the brightness of the displayed image, enabling contrast to be improved.

The present invention is attained by a second liquid crystal device, comprising: a plurality of pixels arranged in a matrix, each pixel having an opening to allow passage of light; and a micro-lens array that has a plurality of micro-lenses arranged in a matrix that divides illumination light into a plurality of partial light beams and converges the light to a light incidence plane of the pixels. Taking x, y, z as axes set at right-angles to one another and z as being parallel to a center axis of light exiting the plurality of pixels, each micro-lens is formed as a concentric lens, and when a clear viewing vector representing a clear viewing direction of the liquid crystal device is broken down into a y vector component and an x vector component, an optical center of each micro-lens is offset from the center axis of the opening of the pixel in a negative direction along a selected one of the y vector component and x vector component.

Like the first liquid crystal device, the second liquid crystal device of this invention makes it possible to improve contrast compared to that of a conventional liquid crystal device. In particular, in the case of the second liquid crystal device even when there are differences in intensity distribution between the liquid crystal device illumination light beams having different directional components based on the illumination position, it is still possible to reduce the contrast distribution in the plane of the liquid crystal device.

In this configuration, it is preferable that the plurality of pixels are classified into a plurality of pixel groups, the liquid crystal device being characterized in that the optical center of the micro-lenses is offset from the center axis of the pixel opening by an amount that is different in each pixel group.

Doing this makes it possible to further increase the uniformity of the contrast in the plane of the liquid crystal device.

The present invention is attained by a first projection display apparatus for projecting an image, comprising: liquid crystal device that modulates light in accordance with supplied image information; an illumination system that projects illumination light at the liquid crystal device; and an optical projection system for projecting modulated light exiting from the liquid crystal device. The liquid crystal device comprises: a plurality of pixels arranged in a matrix, each pixel having an opening to allow passage of light; and a micro-lens array that has a plurality of micro-lenses arranged in a matrix that divides illumination light into a plurality of partial light beams and converges the light to a light incidence plane of the pixels. Characteristics of micro-lenses are adjusted to increase a proportion of light exiting from the opening of each pixel substantially parallel to a clear viewing direction of the liquid crystal device compared to a proportion of light parallel to other directions.

Since the above-described first projection display apparatus uses the first liquid crystal device of the invention, the contrast of displayed images can be improved compared to that of a conventional projection display apparatus.

In accordance with one preferable structure of the first projection display, the micro-lenses are formed as concentric lenses and are each positioned so that an optical center thereof is offset from a center axis of each pixel to increase a proportion of light exiting from the opening of each pixel substantially parallel to the clear viewing direction of the liquid crystal device compared to the proportion of light parallel to the other directions.

Thus, since in overall terms the illumination light from the illumination system enters the liquid crystal device parallel to the clear viewing direction, in overall terms the light beams exiting the micro-lenses also exit parallel to the clear viewing direction and, moreover, nearly all pass through substantially the center of the corresponding pixel. Accordingly, there is little reduction in the amount of illumination light that enters the liquid crystal device, meaning there is little reduction in the brightness of the displayed image, thereby enabling the contrast to be improved. The above illumination system refers to a broadly defined illumination system that includes so-called narrowly defined optical illumination systems having a light path that extends from the emission of light from the illumination system to the entry of the illumination light into the liquid crystal device, and the various optical systems provided along the light path.

The above first projection display apparatus may be comprise: a color separator that separates the illumination light into a plurality of colors; a plurality of the liquid crystal devices to receive each of the plurality of colors into which the light is separated by the color separator; and a color combiner for combining light of the colors exiting the plurality of liquid crystal devices. Combined light exiting the color combiner is projected by the projection display apparatus via the optical projection system.

This enables color images to be displayed with improved contrast.

The present invention is attained by a second projection display apparatus, comprising: liquid crystal device that modulates light in accordance with supplied image information; an illumination system that projects illumination light at the liquid crystal device; and an optical projection system for projecting modulated light exiting from the liquid crystal device. The liquid crystal device comprises: a plurality of pixels arranged in a matrix, each pixel having an opening to allow passage of light; and a micro-lens array that has a plurality of micro-lenses arranged in a matrix that divides illumination light into a plurality of partial light beams and converges the light to a light incidence plane of the pixels. Taking x, y, z as axes set at right-angles to one another and z as being parallel to a center axis of light exiting the plurality of pixels, each micro-lens is formed as a concentric lens, and when a clear viewing vector representing a clear viewing direction of the liquid crystal device is broken down into a y vector component and an x vector component, an optical center of each micro-lens is offset from the center axis of the opening of the pixel in a negative direction along a selected one of the y vector component and x vector component.

Since the above-described second projection display apparatus uses the second liquid crystal device of the invention, the contrast of displayed images can be improved compared to that of a conventional projection display apparatus.

The above second projection display apparatus may be comprise: a color separator that separates the illumination light into a plurality of colors; a plurality of the liquid crystal devices to receive each of the plurality of colors into which the light is separated by the color separator; and a color combiner for combining light of the colors exiting the plurality of liquid crystal devices. Combined light exiting the color combiner is projected by the projection display apparatus via the optical projection system.

This enables color images to be displayed with improved contrast.

In accordance with one preferable structure of the first projection display for projecting color images, each micro-lens is disposed with the optical center of the micro-lens offset from the center axis of the opening of the pixel along one of the y vector component and x vector component of the clear viewing direction in a negative direction that is parallel to a direction perpendicular to a plane of incidence of light of each color that exits from the plurality of liquid crystal devices into the color combiner.

Here, "plane of incidence of light" refers to a plane defined by the incident principal ray and the incident normal.

This makes it possible to more effectively decrease unevenness in the contrast, brightness and colors of displayed color images.

These and other objects, features, aspects, and advantages of the present invention will become more apparent from the following detailed description of the preferred embodiments with the accompanying drawings.

BRIEF DESCRIPTION OF THE DRAWINGS

FIGS. 11(A-1) through 11(B-2) are diagrams illustrating the contrast and the brightness of image displayed by the light valves of the projection display apparatus 10D, having the angular distribution of the incident light shown in FIG. 10;

FIGS. 12(A-1) through 12(B-2) are diagrams illustrating the contrast and the brightness of image displayed by the light valves of the projection display apparatus 10E, having the angular distribution of the incident light shown in FIG. 10;

DESCRIPTION OF THE PREFERRED EMBODIMENTS

Figure 1:
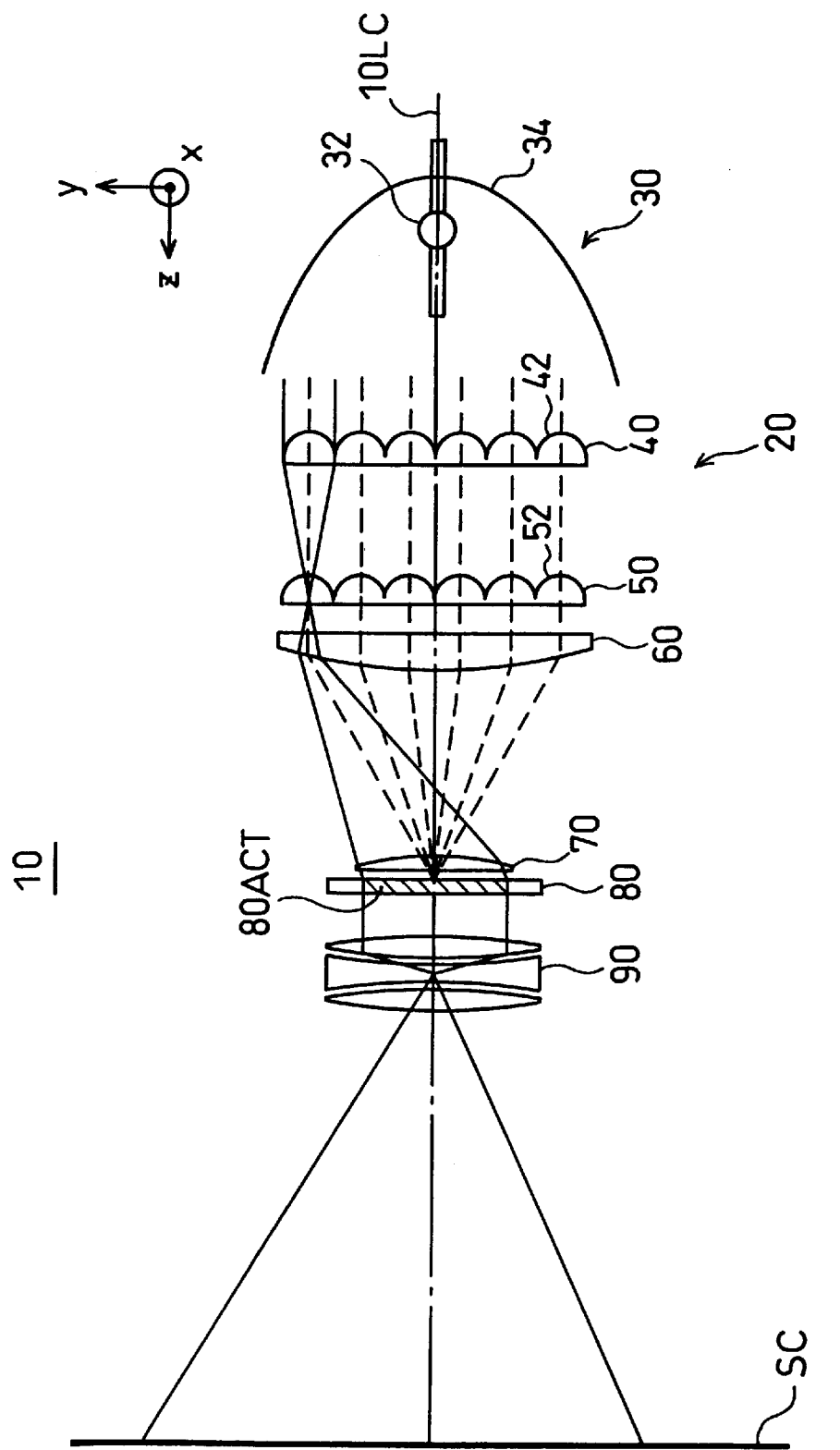
FIG. 1 is a general view showing the configuration of the principal parts of a projection display apparatus 10 according to a first embodiment.

A. First embodiment:

FIG. 1 is a general view showing the configuration of the principal parts of a projection display apparatus 10 according to a first embodiment. The projection display apparatus 10 is equipped with an illumination system 20, a field lens 70, a first liquid crystal device 80 of the invention, and a projection lens system 90. These structural components are arranged along a system optical axis 10LC with the optical axis of each component in alignment with the system optical axis 10LC.

The illumination system 20 includes a light source 30 that emits a substantially parallel beam of light, a first lens array 40, a second lens array 50 and a superposing lens 60. The illumination system 20 is an optical integrator for providing substantially uniform illumination of an illumination region of the first liquid crystal device 80 (an image display region, also called "effective display region").

The light source 30 has a light source lamp 32 for emitting light rays radially and a concave mirror 34 for emitting the light from the light source lamp 32 as a parallel beam. The light source lamp 32 may be a metal halide lamp or a mercury lamp or the like. A parabolic reflector is usually used as the concave mirror 34.

Figure 2:
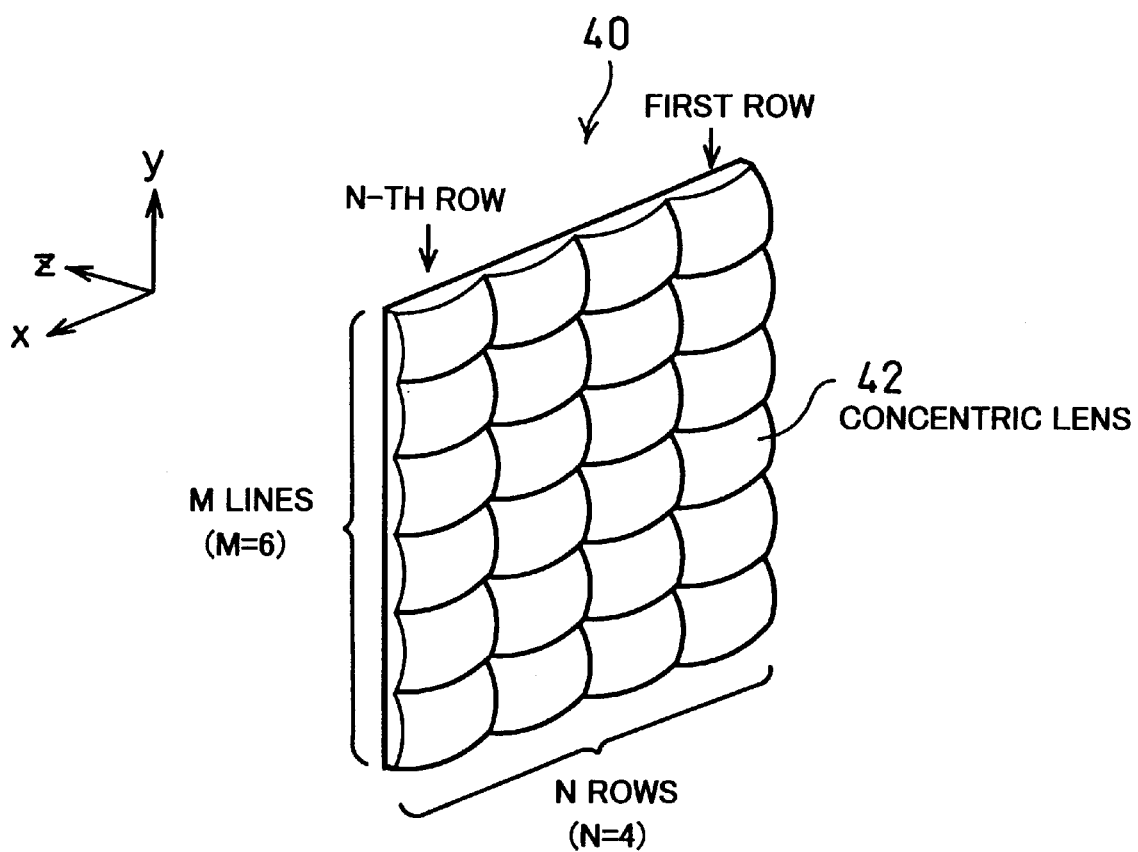
FIG. 2 is a perspective view of a first lens array 40.

FIG. 2 is a perspective view of the first lens array 40. The first lens array 40 is formed as a matrix of M lines and N rows of small, substantially rectangular lenses 42. In this example, M=6 and N=4. The small lenses 42 divide the light beam emitted by the light source 30 (FIG. 1) into a plurality (that is, M×N) of small, partial beams and focus each of these partial beams in the vicinity of the second lens array 50. The small lenses 42 are shaped so that when viewed from direction z each is substantially analogous in shape to the illumination region of the liquid crystal device 80. If the illumination region 80ACT (FIG. 1) of the liquid crystal device 80 has a 4:3 aspect ratio (the ratio of width to height), for example, each of the small lenses 42 is given an aspect ratio of 4:3. In the example of this embodiment, the aspect ratio of the small lenses 42 is set at 4:3.

The second lens array 50 (FIG. 1) is also formed as a matrix of M lines and N rows of small lenses 52 that correspond to the small lenses 42 of the first lens array 40. The second lens array 50 functions to effectively illuminate, via the superposing lens 60, the illumination region 80ACT of the liquid crystal device 80, using the light emitted by the first lens array 40. The plurality of partial light beams transmitted by the first and second lens arrays 40 and 50 are superposed on the liquid crystal device 80 by the superposing lens 60. The function of the field lens 70 is to convert the partial light beams used for illuminating the illumination region 80ACT so that the center axes thereof are parallel.

In this example the second lens array 50 and superposing lens 60 are separate. However, the second lens array 50 may be configured to also have the function of the superposing lens 60. For example, the small lenses may be formed as eccentric lenses.

In the projection display apparatus 10 shown in FIG. 1, the substantially parallel beam of light emitted by the light source 30 is divided into a plurality of partial beams by the first and second lens arrays 40 and 50. The partial beams exiting the small lenses 42 of the first lens array 40 are each converged by the small lenses 42 to focus and form a light source image of the light source 30 (secondary light source image) in the vicinity of the corresponding small lenses 52 of the second lens array 50. The partial light beams emitted from the secondary light source images formed in the vicinity of the second lens array 50 diverge and are superposed by the superposing lens 60 over the illumination region of the liquid crystal device 80 (a region including the illumination region 80ACT). The light for illuminating the illumination region 80ACT is converted by the field lens 70 into light that overall is substantially parallel to the system optical axis 10LC. As a result, the illumination region 80ACT of the liquid crystal device 80 is illuminated substantially uniformly.

The liquid crystal device 80 functions as a light modulator that modulates the incident illumination light from the illumination system 20 in accordance with supplied image information (image signals) to thereby form an image. The projection lens system 90 functions as an optical projection system that displays the modulated light from the liquid crystal device 80 as an image that is projected onto a screen SC.

Figure 3:
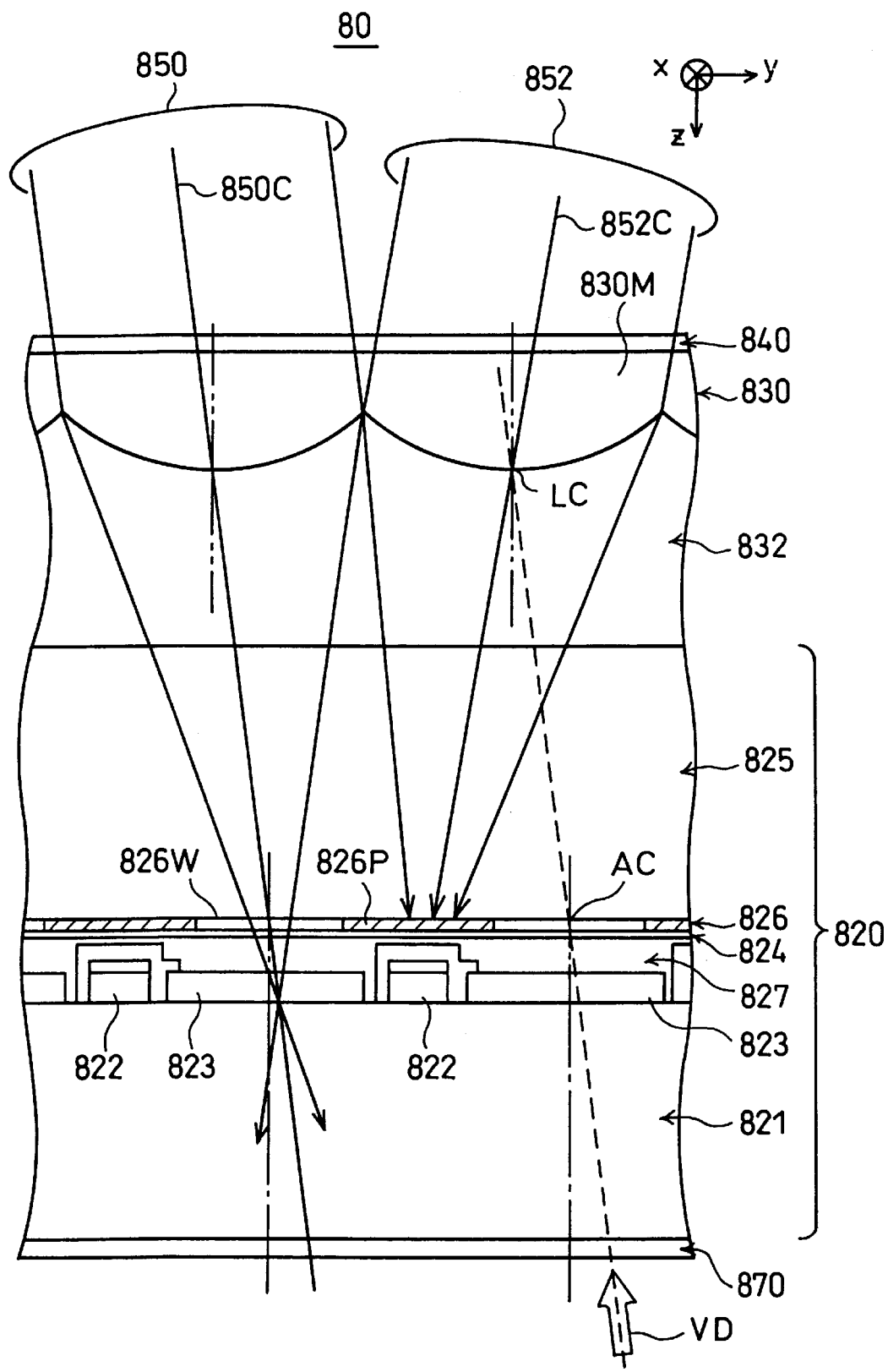
FIG. 3 is an enlarged cross-sectional view of a part of a first liquid crystal device 80 of this invention.
Figure 14:
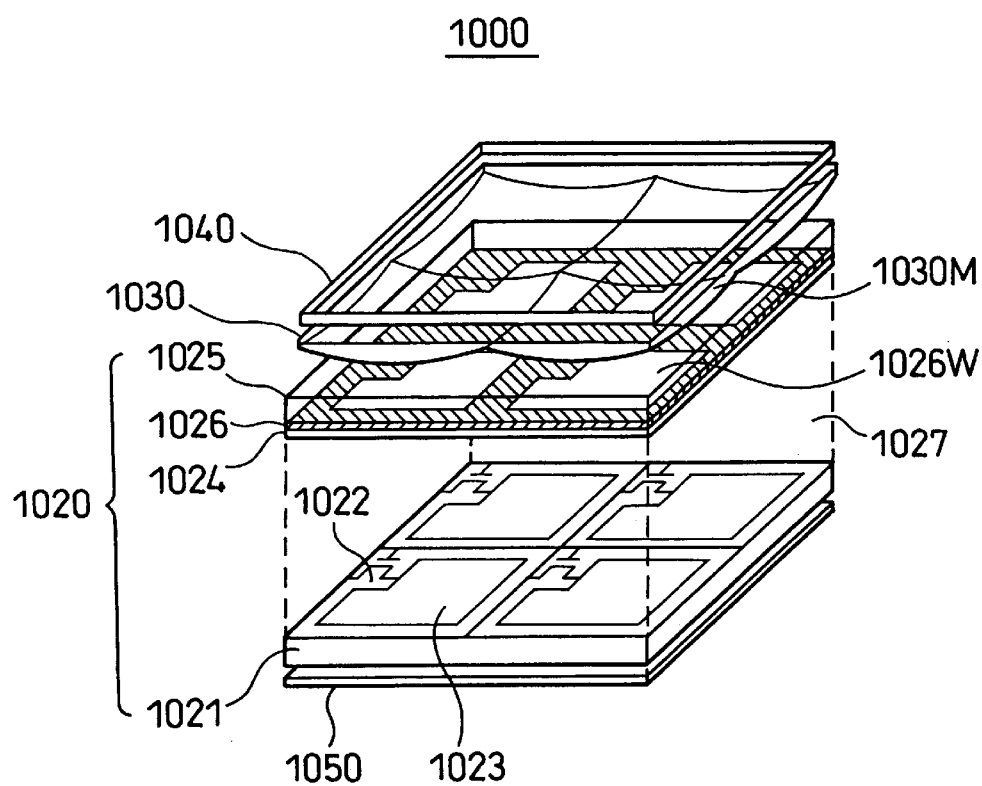
FIG. 14 is an exploded view showing the general configuration of a conventional liquid crystal device 1000.
Figure 15:
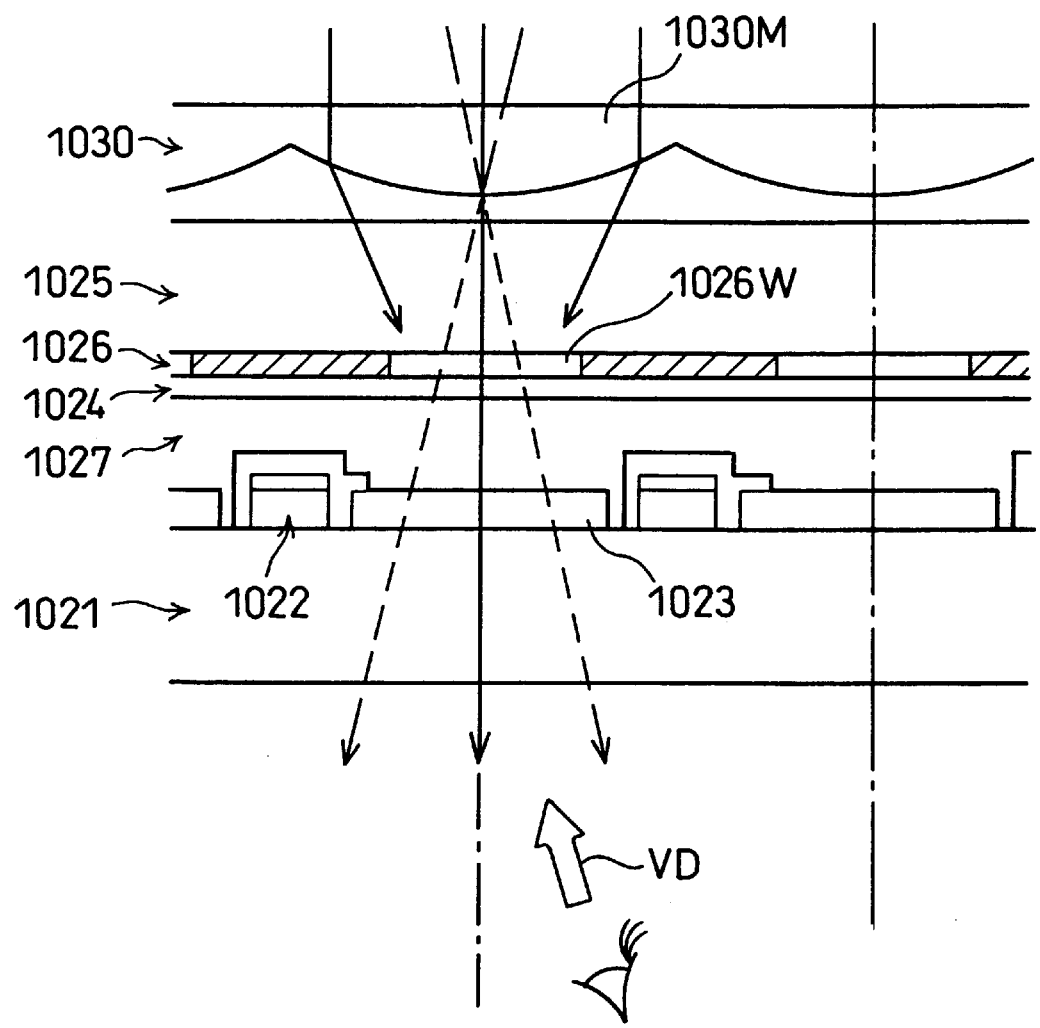
FIG. 15 is a drawing illustrating the passage of incident light through the liquid crystal device 1000.

FIG. 3 is an enlarged cross-sectional view of a part of the first liquid crystal device 80 of this invention. The liquid crystal device 80 includes a liquid crystal cell 820, a micro-lens array 830 and a pair of polarizers 840 and 870, and is the same as the conventional liquid crystal device 1000 shown in FIG. 14, except for the positional relationship of the micro-lens array 830 and liquid crystal cell 820.

Like the liquid crystal device 1000, the liquid crystal cell 820 has a transparent substrate 821, an opposed substrate (transparent substrate) 825 and a liquid crystal layer 827 between the transparent substrate 821 and the opposed substrate 825. A thin-film transistor 822 and pixel electrode 823 are provided on the transparent substrate 821 for each pixel. A common electrode 824 is provided on the opposed substrate 825. A light shield layer 826 is provided between the opposed substrate 825 and the common electrode 824. The light shield layer 826 has a corresponding opening 826W for each pixel electrode 823. Each pixel is constituted of one pixel electrode 823 and the common electrode 824, with the liquid crystal layer 827 disposed therebetween. Rather than being provided between the common electrode 824 and opposed substrate 825, the light shield layer 826 may be provided on the plane of incidence (the upper surface) of the opposed substrate 825, that is, on the plane of incidence of the liquid crystal cell 820, or on the transparent substrate 821.

Figure 4B:
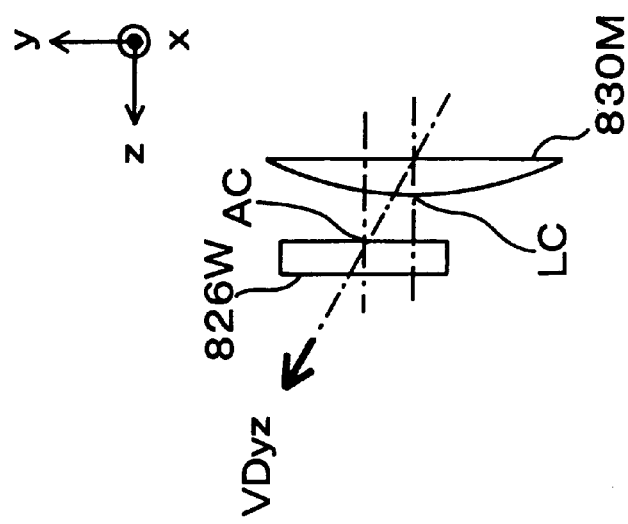
FIGS. 4(A) and 4(B) are views illustrating the positional relationship between micro-lenses 830M and openings 826W.
Figure 4A:
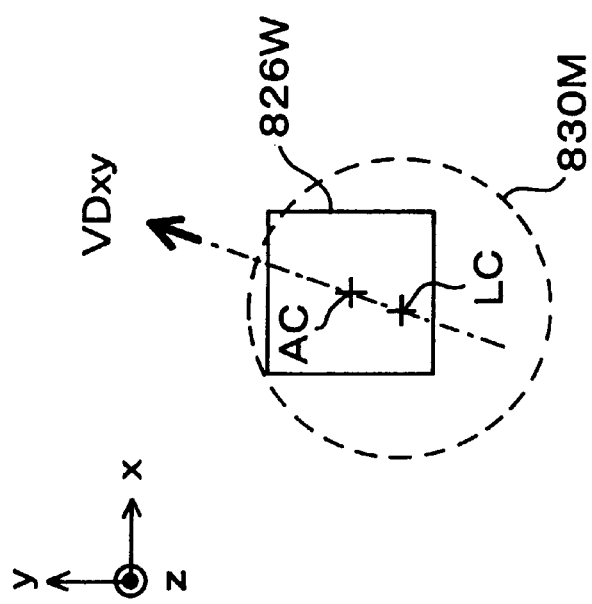

The micro-lens array 830 is affixed to the upper side of the opposed substrate 825 via a bonding layer 832. The micro-lens array 830 has a plurality of micro-lenses 830M. The micro-lens array 830 is constituted of concentric lenses. FIGS. 4(A) and 4(B) illustrate the positional relationship between the micro-lenses 830M and the openings 826W. The micro-lenses 830M making up the micro-lens array 830 are each positioned at an offset from the center axis of the opening 826W of the corresponding pixel so that a line connecting the center LC on the optical axis of each micro-lens 830M with the center AC on the optical axis of the the corresponding opening 826W is substantially parallel to vector components VDxy and VDyz in plane xy and plane yz of clear viewing vector VD representing the clear viewing direction (hereinafter also referred to simply as "clear viewing direction" or "clear viewing vector").

In the FIG. 3, the first polarizer 840 is provided on the opposite side of the micro-lens array 830 to the opposed substrate 825, and the second polarizer 870 (FIG. 3) is provided on the opposite side of the transparent substrate 821 to the liquid crystal layer 827.

The first and second polarizers 840 and 870 may be affixed to the micro-lens array 830 and liquid crystal cell 820 by adhesive, for example, or they may be associated using an assembly jig. Also, while in the drawing the polarizers 840 and 870 are shown in contact with the micro-lens array 830 and liquid crystal cell 820, they may also be provided separated therefrom.

The passage of incident light through the liquid crystal device 80 will now be explained. Light entering the micro-lens array 830 is divided into small light beams by the plurality of micro-lenses 830M and each small light beam is converged by the micro-lens concerned. Each small beam 850 that is parallel to the clear viewing direction VD is focused in the vicinity of the corresponding pixel electrode 823. At this time, the center 850C of the small beam 850 substantially passes straight through the center AC of the opening 826W. Also, the small beam 850 focused by the micro-lens 830M is virtually all transmitted by the opening 826W, entering the liquid crystal layer 827, and is emitted after modulation.

On the other hand, light that is not parallel to the clear viewing direction VD such as, for example, small beam 852 having an angle of incidence symmetrical with that of the small beam 850, is also converged in the vicinity of the corresponding pixel electrode 823. At this time the center 852C of the small beam 852 impinges at a position that is away from the center AC of the opening 826W, such as for example on shield portion 826P of the light shield layer 826, as shown in the drawing. Most of the small beam 852 is focused by the micro-lens 830M to impinge on the shield portion 826P, which means that almost none of the small beam 852 enters the liquid crystal layer 827. There are cases in which some small beams that are not parallel to the clear viewing direction VD or to small beams 852 will, depending on the angle of incidence on the micro-lenses 830M, pass through the openings 826W and into the liquid crystal layer 827. However, compared to the amount of such light emitted by the micro-lenses 830M, the amount of light transmitted by the liquid crystal layer 827 can be reduced.

As can be seen from the foregoing explanation, of the light exiting the liquid crystal device 80, the amount of incident light from a direction not parallel to the clear viewing direction VD can be reduced with almost no decrease in the amount of light parallel to the clear viewing direction VD. As a result, although the amount of light exiting the liquid crystal device 80 is reduced, the proportion of light parallel to the clear viewing direction VD can be increased. Thus, the liquid crystal device 80 can display images with an improved contrast compared to that of a conventional liquid crystal device.

Moreover, since the projection display apparatus 10 (FIG. 1) uses the liquid crystal device 80 of this invention, the contrast of images displayed by being projected on a screen SC also is improved.

In particular, the passage of the illumination light of the illumination system 20 through the field lens 70 makes it possible to view the light as being almost all substantially parallel to the clear viewing direction VD. However, there are partial light beams that through the small lenses 42 and 52 of the first and second lens arrays 40 and 50 and enter the liquid crystal device 80 at an angle of incidence that depends on the point of such passage. In many cases, therefore, the component of the illumination light produced by the illumination system 20 that is not parallel to the system optical axis 1 C may be larger than that of illumination light obtained without the use of an optical integrator. This is a major factor in the decrease in contrast described in the above. However, as the projection display apparatus 10 uses the first liquid crystal device 80 of the invention, it is possible to control the decrease in the contrast of the image projected on the screen SC.

In the above embodiment the micro-lenses 830M making up the micro-lens array 830 are described as being positioned at an offset from the center axis of the corresponding pixel opening 826W whereby a line connecting the center LC on the optical axis of each micro-lens 830M with the center AC on the optical axis of the the corresponding opening 826W is substantially parallel with the clear viewing direction VD. However, the invention is not limited thereto. For example, the configuration may be one whereby the line connecting the center LC on the optical axis of each micro-lens 830M with the center AC on the optical axis of the the corresponding opening 826W is inclined relative to the center axis of each pixel in a direction parallel to the clear viewing direction. This would enable the proportion of light parallel to the clear viewing direction VD to be increased, thereby improving the contrast. That is, each micro-lens could be positioned out of alignment with the center axis of each pixel so as to increase the proportion of light exiting each pixel that is parallel to the clear viewing direction compared to the proportion of light that is not parallel to the clear viewing direction.

Also, while the above embodiment has been described with reference to the example of a liquid crystal device 80 that displays monochrome images, it can be configured as a liquid crystal device for displaying color images. For that, the opening 826W of the light shield layer 826 (FIG. 3) would generally be provided in turn with red, green and blue filters for each pixel, but other than that, the structural components would be the same as those of the liquid crystal device 80.

Figure 5:
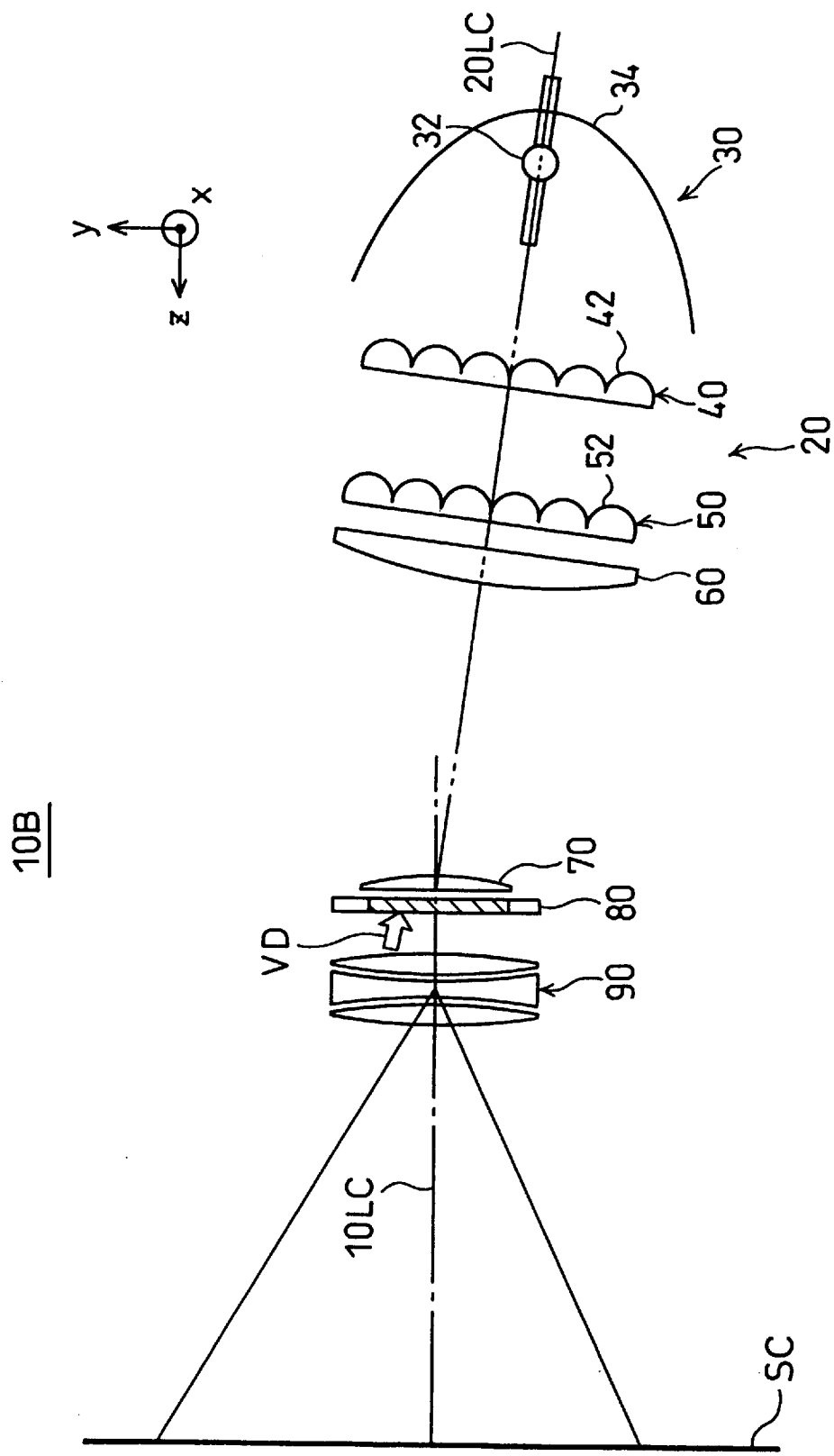
FIG. 5 is a general view showing the configuration of the principal parts of a projection display apparatus 10B according to a second embodiment.

B. Second embodiment:

FIG. 5 is a general view showing the configuration of the principal parts of a projection display apparatus 10B according to the second embodiment. Except for the positioning of the illumination system 20 the projection display apparatus 10B is identical to the projection display apparatus 10 of the first embodiment. Therefore, further explanation of the structural components is omitted.

In the projection display apparatus 10B, optical axis 20LC of the illumination system 20 is set at an angle to the system optical axis 10LC whereby the optical axis 20LC is parallel to the clear viewing direction VD of the liquid crystal device 80. In overall terms this enables the illumination light from the illumination system 20 to be emitted parallel to the clear viewing direction VD, thereby increasing the amount of light impinging on the liquid crystal device 80 that is parallel to the clear viewing direction VD. Thus, while in the case of the projection display apparatus 10 of the first embodiment it was necessary to decrease the amount of light in order to improve the contrast, degrading the brightness of the image, in the case of the projection display apparatus 10B of the second embodiment the contrast can be improved with little decrease in brightness.

While this embodiment is described with reference to an arrangement in which the optical axis 20LC is set at an angle parallel to the clear viewing direction VD, this is not limitative. Instead, for example, a configuration may be used whereby the optical axis 20LC is parallel to the system optical axis 10LC while being also displaced therefrom in the -y direction, and in which a reflecting mirror is provided between the illumination system 20 and the field lens 70. With such an arrangement, illumination light from the illumination system 20 could be directed in a direction parallel to the clear viewing direction VD by being reflected by the mirror. That is, the light path from the emission of illumination light from the illumination system, in the narrow sense of the term, to the impingement of the light on the liquid crystal device, and illumination systems in the broad sense of the term that include various optical systems provided along this light path, may be positioned so that the center axis of light incident on the liquid crystal device is substantially parallel to the clear viewing direction.

In the case of the second embodiment, too, the liquid crystal device used can be configured as one that displays color images.

Figure 6:
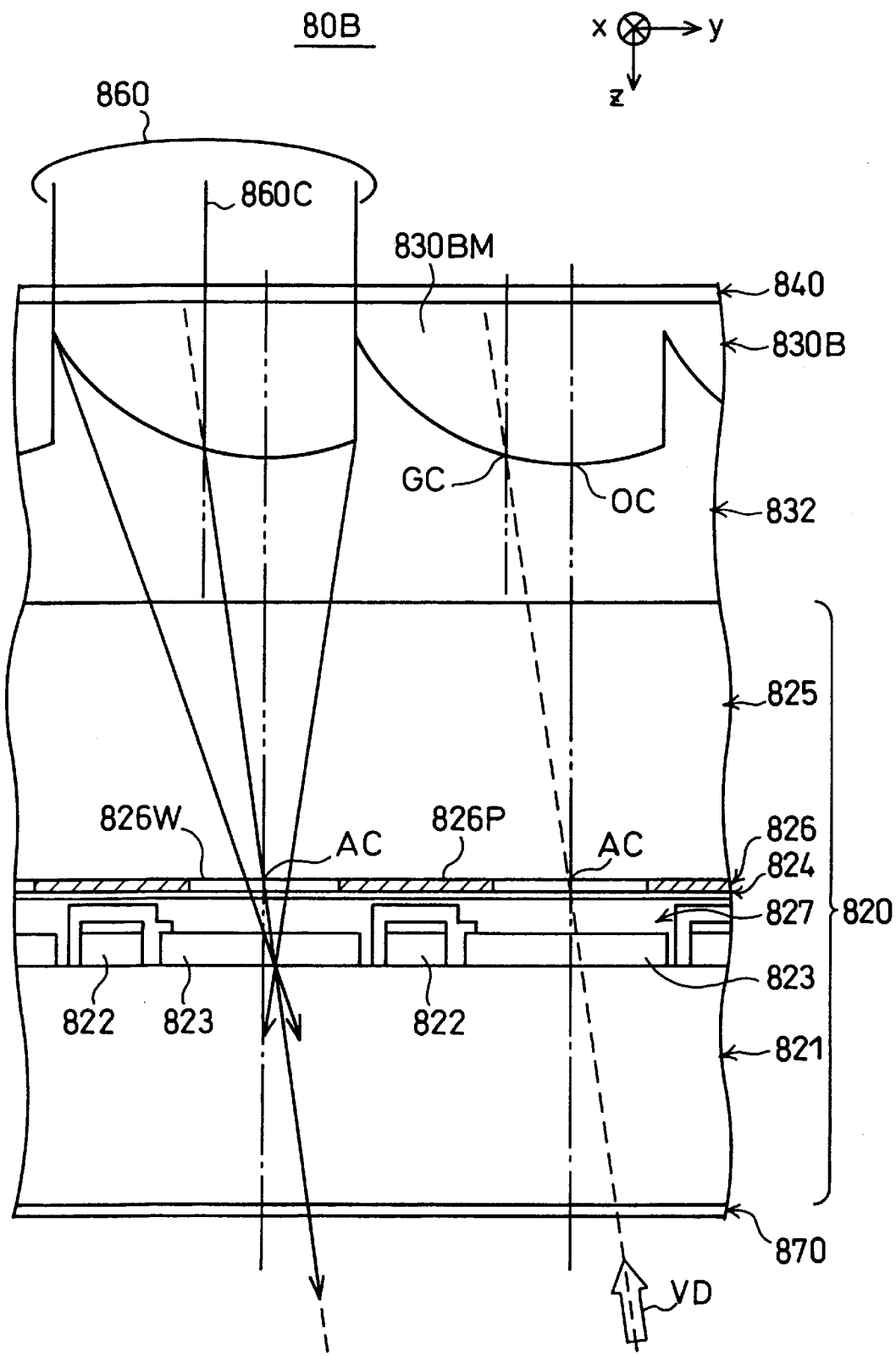
FIG. 6 is a general cross-sectional enlarged view of part of a liquid crystal device 80B applied to a projection display apparatus 10C according to a third embodiment of invention.

C. Third embodiment:

FIG. 6 is a general cross-sectional enlarged view of part of a liquid crystal device 80B applied to a projection display apparatus 10C according to a third embodiment of the invention. Except for the use of the second liquid crystal device 80B in place of the first liquid crystal device 80, this projection display apparatus 10C is the same as the projection display apparatus 10 of the first embodiment shown in FIG. 1. Similarly, other than the fact that micro-lens array 830B is used instead of the micro-lens array 830, the second liquid crystal device 80B is the same as the first liquid crystal device 80 shown in FIG. 3. Thus, further explanation of the related structural components is omitted.

Each of the plurality of micro-lenses 830BM comprising the micro-lens array 830B is an eccentric lens in which the geographical center GC of the lens does not coincide with the optical center OC. Each of the micro-lenses 830BM is positioned at an offset to the center axis of the corresponding opening 826W whereby a line between the geographical center GC of each of the micro-lenses 830BM and the center AC of the pixel opening 826W is substantially parallel to the clear viewing direction VD. The optical center OC of the micro-lens 830BM is located on the center axis of the opening 826W (a line passing through the opening 826W center AC perpendicular to the opening 826W).

Light entering the micro-lenses 830BM perpendicular to the plane of incidence, that is, light that is substantially parallel to the system optical axis 10LC (not shown) of the projection display apparatus 10C, is divided into small beams 860 by each of the micro-lenses 830BM that exit toward the corresponding pixel 823. At this time, the center 860C of the small beam 860 is deflected to pass substantially through the center AC of the opening 826W. Moreover, the micro-lens 830BM converges the small beam 860 in the vicinity of the corresponding pixel electrode 823. As a result, almost all of the small beam 860 passes through the opening 826W to the liquid crystal layer 827, is modulated and exits. In overall terms the illumination light from the illumination system 20 that enters the liquid crystal device 80B is light that is substantially parallel to the system optical axis 10LC. Therefore, the major part of the illumination light impinging on light source 30 liquid crystal device 80B enters the liquid crystal layer 827 having been deflected parallel to the clear viewing direction VD. Light emitted by the illumination system 20 that is not parallel to the system optical axis 10LC is also deflected by the micro-lens 830BM. Of this, light that impinges on light shield layer 826P is thereby blocked and so does not impinge on the liquid crystal layer 827.

As is clear from the foregoing explanation, when illumination light that in overall terms is substantially parallel impinges on the liquid crystal device 80B substantially perpendicularly to the plane of incidence, substantially all the incident light can be deflected and emitted parallel to the clear viewing direction VD by the liquid crystal device 80B. As a result, the proportion of light parallel to the clear viewing direction VD can be increased without much decrease in the amount of light exiting the liquid crystal device 80B compared to the amount of incident light. That is, the liquid crystal device 80B can improve the contrast of displayed images compared to that obtained with a conventional liquid crystal device. Moreover, since the projection display apparatus 10C uses the second liquid crystal device 80B, the contrast of displayed images projected onto the screen SC can also be improved.

In this liquid crystal device 80B the optical center OC of the micro-lens 830BM is positioned on the center axis of the corresponding pixel opening 826W. A configuration may be used in which a line connecting the geographical center GC and the center AC of the corresponding pixel opening 826W is angled in the same direction as the clear viewing direction VD. In such a case, as in the first embodiment, there will be a decrease in the amount of light exiting from the liquid crystal device, but contrast can be improved. That is, micro-lenses may be used in which the optical center does not coincide with the geographical center whereby the proportion of light emitted from each pixel that is parallel to the clear viewing direction is increased compared to the proportion of light having a different directional component.

As explained with reference to the first embodiment, when the illumination system 20 is configured as an optical integrator, there are cases in which illumination light of the highest intensity impinges on the liquid crystal device 80 at an angle of incidence that is based on where the light was transmitted. In such a case, as the micro-lenses there may be used lenses in which the geographical center GC and optical center OC do not coincide, which are configured to deflect incident light components of the highest intensity so that such light is emitted in a direction that is substantially parallel to the clear viewing direction VD. With such an arrangement, even when illumination light of the highest intensity impinges on the liquid crystal device 80 at an angle of incidence corresponding to the point of transmission, it is possible to increase the proportion of light that is parallel to the clear viewing direction VD without light exiting from the liquid crystal device 80B exhibiting much of a decrease in intensity from the intensity of the incident light. This means contrast can be improved compared to that of a conventional liquid crystal device. Moreover, with a projection display apparatus using such a liquid crystal device, images can be projected onto a screen SC with little decrease in brightness, helping to improve the contrast.

In the case of this third embodiment, too, the liquid crystal device used can be configured as one that displays color images.

Figure 7:
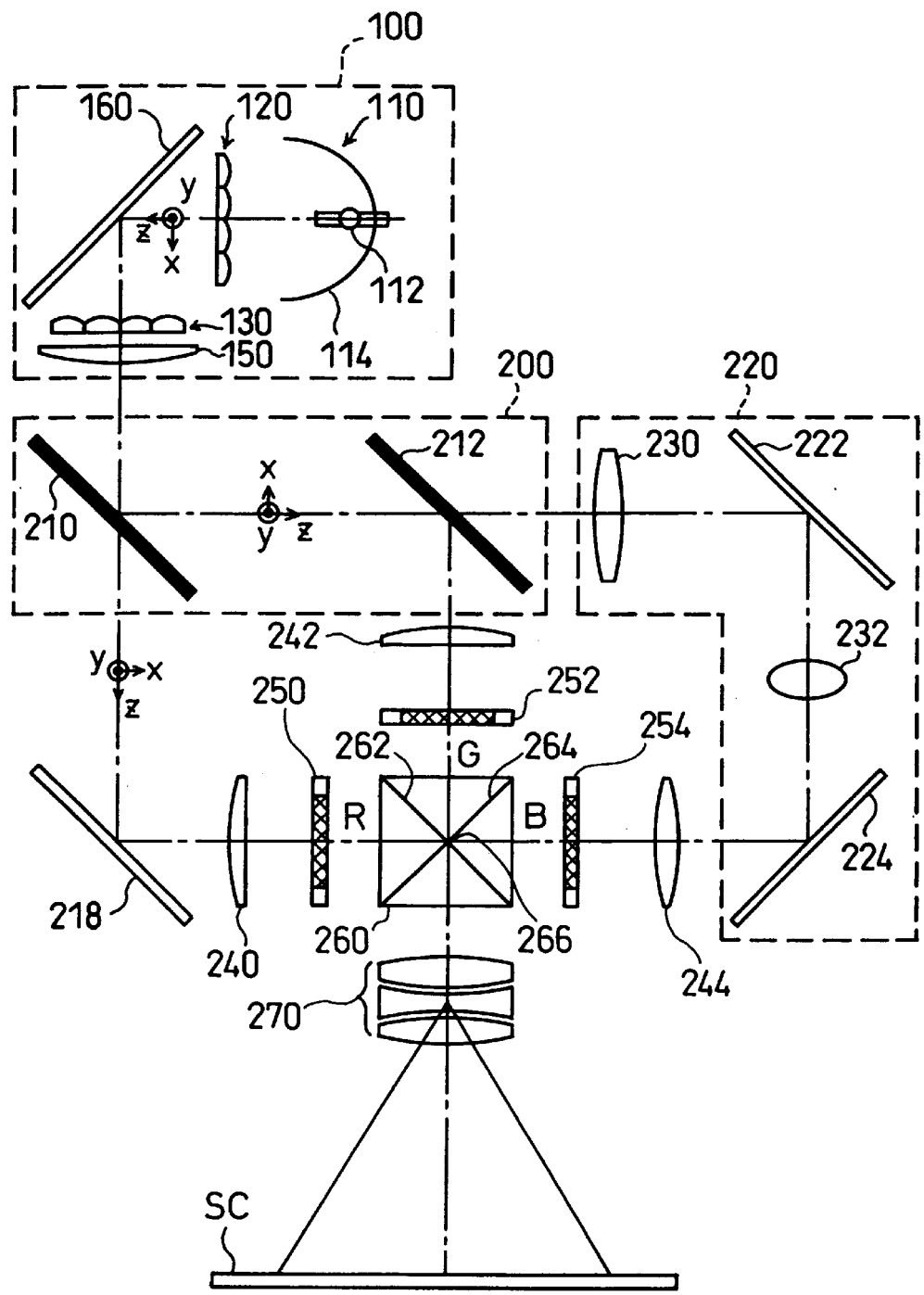
FIG. 7 is a general view showing the configuration of the principal parts of a projection display apparatus 10D according to a fourth embodiment.

D. Fourth embodiment:

A projection display apparatus can be configured to display color images, using three of the first liquid crystal devices 80 or three of the second liquid crystal devices 80B described above. FIG. 7 is a general view showing the configuration of the principal parts of a projection display apparatus 10D that is a fourth embodiment. The projection display apparatus 10D has an illumination system 100, a color separator 200, an optical guide system 220, a reflecting mirror 218, three field lenses 240, 242 and 244, three liquid crystal devices 250, 252 and 254, a cross-dichroic prism 260 and a projection lens system 270. The liquid crystal devices 250, 252 and 254 are each the same as the second liquid crystal device 80B (FIG. 6). In the following, the liquid crystal devices are also referred to as light valves.

The illumination system 100 includes a light source 110, a first lens array 120, a second lens array 130, a superposing lens 150 and a reflecting mirror 160. Except for the reflecting mirror 160, the illumination system 100 is the same as the illumination system 20. For convenience the reference numerals of the parts have been changed. The reflecting mirror 160 is provided to deflect the direction of the light. In terms of function, the illumination system is the same as the illumination system 20, so further description thereof is omitted.

The color separator 200 has a pair of dichroic mirrors 210 and 212. The color separator 200 functions to separate a beam of illumination light from the illumination system 100 into three colors: red, green and blue. The first dichroic mirror 210 transmits red components in the light beam emitted by the illumination system 100 and reflects blue and green components. Red light transmitted by the dichroic mirror 210 is reflected by the reflecting mirror 218, directing the light through the field lens 240 and onto the light valve 250 for red light. The field lens 240 converts the partial light beams emitted by the second lens array 130 into a beam of light parallel to the center axis (principal beam) thereof. This is also the case with the field lenses 242 and 244 disposed in front of the other light valves.

Of the blue and green light that is reflected by the first dichroic mirror 210, the green light is reflected by the second dichroic mirror 212 and is thereby directed to the light valve 252 for green light via the field lens 242. The blue light passes through the second dichroic mirror 212 and impinges on the optical guide system 220. The optical guide system 220 includes an entrance lens 230, a relay lens 232 and reflecting mirrors 222 and 224. Blue light transmitted by the second dichroic mirror 212 passes through the optical guide system (relay lens system) 220 and exit lens (field lens) 244 to the light valve 254 for blue light. The blue light path is longer than the light paths of the other colors, so the blue light path is provided with a relay lens system to prevent a decrease in the light utilization efficiency caused by light beam divergence and the like. That is, the relay lens system is to ensure that partial light beams that enter the entrance lens 230 are transmitted unchanged to the exit lens 244.

The three light valves 250, 252 and 254 function as light modulator for forming images by modulating the light of each of the three colors according to supplied image information (image signals). The cross dichroic prism 260 functions as a color combiner for combining the red, blue and green light to form a color image. The cross dichroic prism 260 is formed by a multi-layer dielectric film stack 262 that reflects red light and a multi-layer dielectric film stack 264 that reflects blue light arranged in the form of a cross. The film stacks 262 and 264 are intersected by a center axis 266 that runs along the y axis. The three colors are combined by these multi-layer dielectric film stacks into light carrying the color image to be projected. The light combined by the cross dichroic prism 260 is emitted toward projection lens 270. The light thus combined by the cross dichroic prism 260 is projected on the screen SC by the projection lens 270 constituting the projection system to display an enlarged color image.

For the three light valves 250, 252 and 254, the projection display apparatus 10D uses the same liquid crystal devices as the second liquid crystal device 80B described with reference to the third embodiment. This makes it possible to improve the contrast without much of a decrease in the brightness of the color image projected on the screen SC.

The first liquid crystal device 80 (FIG. 3) may be used for the three light valves 250, 252 and 254. Doing so would enable the contrast of color images projected on the screen SC to be improved. In the case of an apparatus thus configured, it is preferable for the optical elements provided along each light path up to the plane of incidence of the three liquid crystal devices to be arranged so that in each case the center of each beam of incident illumination light is parallel to the clear viewing direction. This will make it possible to increase the contrast without much reduction in the brightness of the color images projected on the screen SC.

E. Fifth embodiment

Figure 8B:
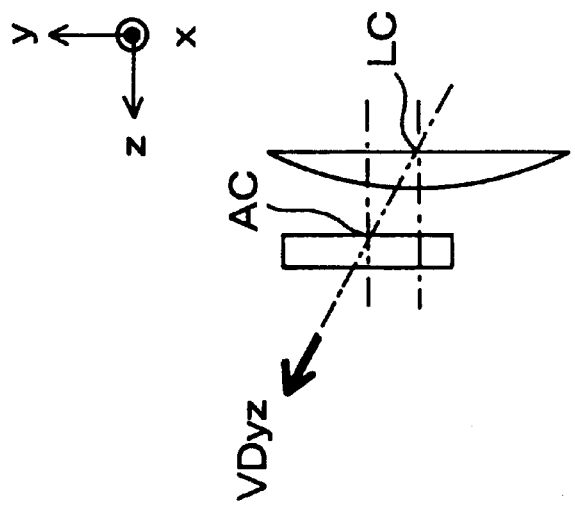
FIGS. 8(A) and 8(B) are views illustrating the position relationship between micro-lens 830M a opening 826W in a liquid crystal device 80C according to a fifth embodiment.
Figure 8A:
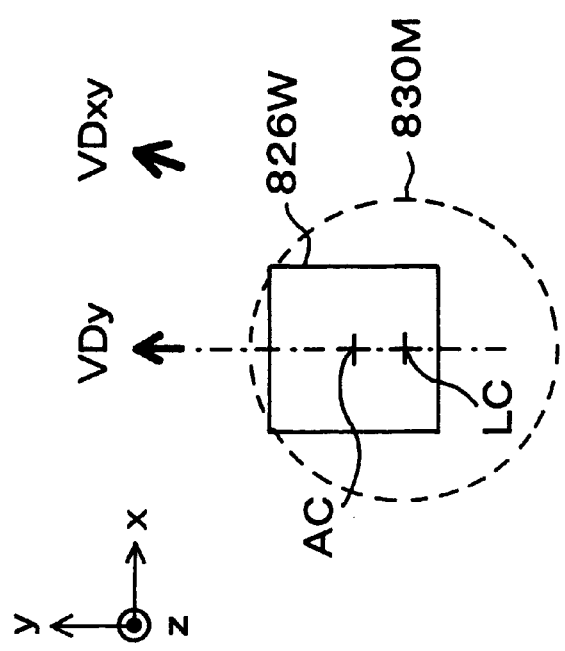

FIGS. 8(A) and 8(B) are views illustrating the position relationship between micro-lens 830M and opening 826W in a liquid crystal device 80C according to a fifth embodiment. FIG. 8(A) is a view from the display surface side of the liquid crystal device 80C, that is, the side from which the light is emitted (along the z axis), and FIG. 8(B) is a view from the side of the liquid crystal device 80C (along the x axis). As shown in FIG. 4(A) and (B), in the first liquid crystal device 80 the micro-lens 830M is positioned at an offset relative to the center axis of the corresponding opening 826W so that a line connecting center LC on the optical axis of the micro-lens 830M with center AC on the center axis of the opening 826W is substantially parallel to the clear viewing vector VD representing the clear viewing direction. That is, the micro-lens 830M is located at a position where the optical axis is out of alignment with the center axis of the opening 826W so as to be substantially parallel with the clear viewing direction vector VD in the xy plane, the vector components VDxy and VDyz in the yz plane.

In the case of the liquid crystal device 80C of this fifth embodiment, the micro-lens 830M is located at an offset relative to the center axis of the corresponding opening 826W whereby a line connecting center LC on the optical axis of the micro-lens 830M with center AC on the center axis of the opening 826W is moved in the negative y direction of the clear viewing direction vector component VDy. It is also located at an offset relative to the center axis of the opening 826W whereby the line becomes substantially parallel to VDyz, the clear viewing direction vector VD in the plane yz.

Figure 9:
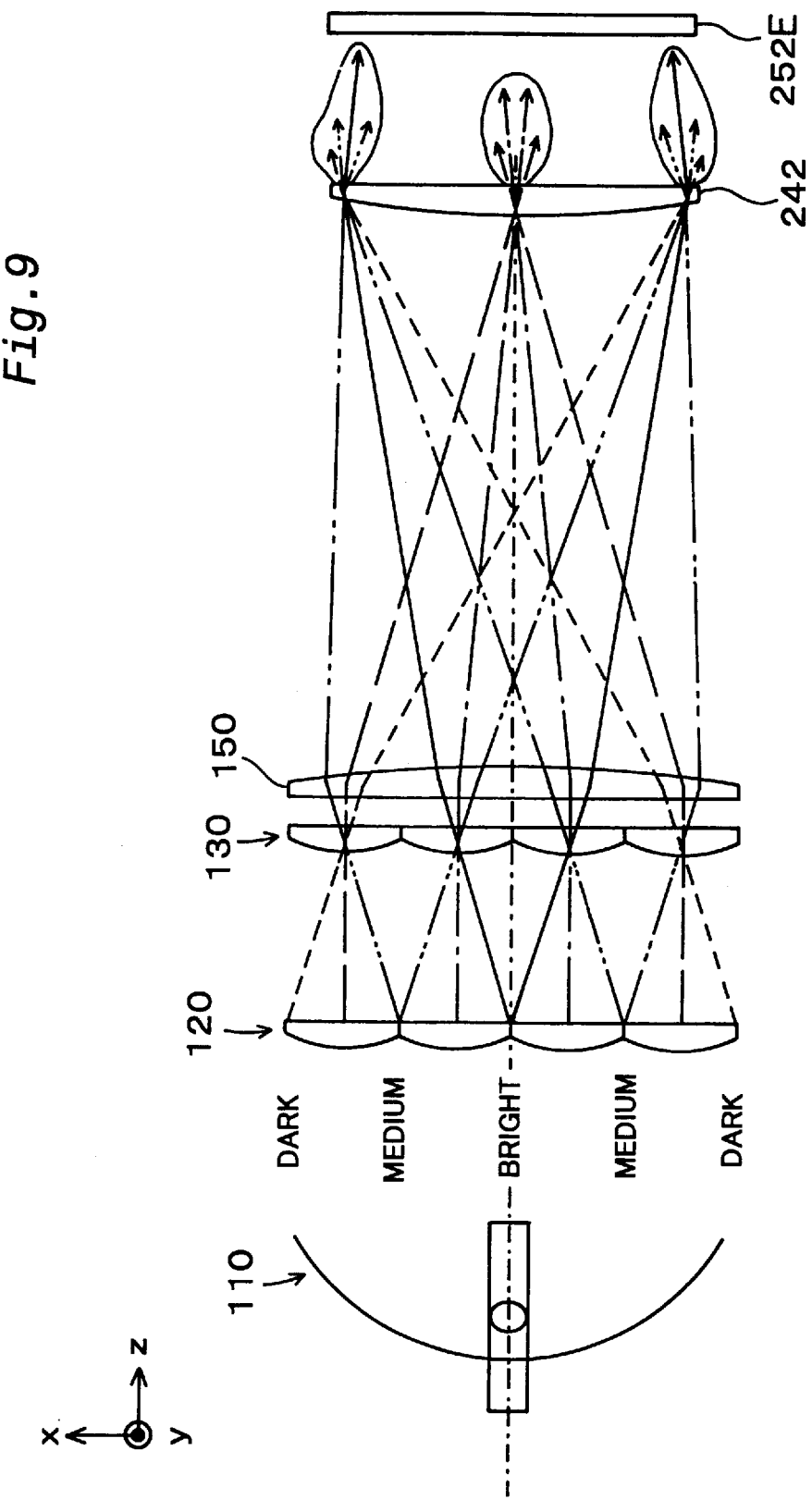
FIG. 9 is a diagram illustrating the incidence of illumination light on a light valve 252E used to handle green light.

Light valves 250E, 252E and 254E of a projection display apparatus 10E that is basically the same as the projection display apparatus 10D of the fourth embodiment will now be described. The light valves 250E, 252E and 254E are each constituted of a liquid crystal device 80C. FIG. 9 is a diagram illustrating the incidence of illumination light on the light valve 252E used to handle green light. A beam of light from light source 110 is divided into a plurality of partial beams by first lens array 120. The light valve 252E is illuminated by these partial beams, via the superposing lens 150. At this time, the partial beams are converted by the field lens 242 into light beams parallel to the center axis of the partial beams. Thus, the partial beams emitted by the field lens 242 each have a different inclination relative to the optical axis 100LC that corresponds to the point on the first lens array 120 from which the beam exits. The intensity of the light from the light source 110 is generally stronger closer to the optical axis 100LC and weaker as the distance from the center increases. As such, the intensity distribution of light relative to the direction of light incidence (hereinafter referred to as "angular distribution of the light") may differ depending on the position of the light valve 252E.

Figure 10:
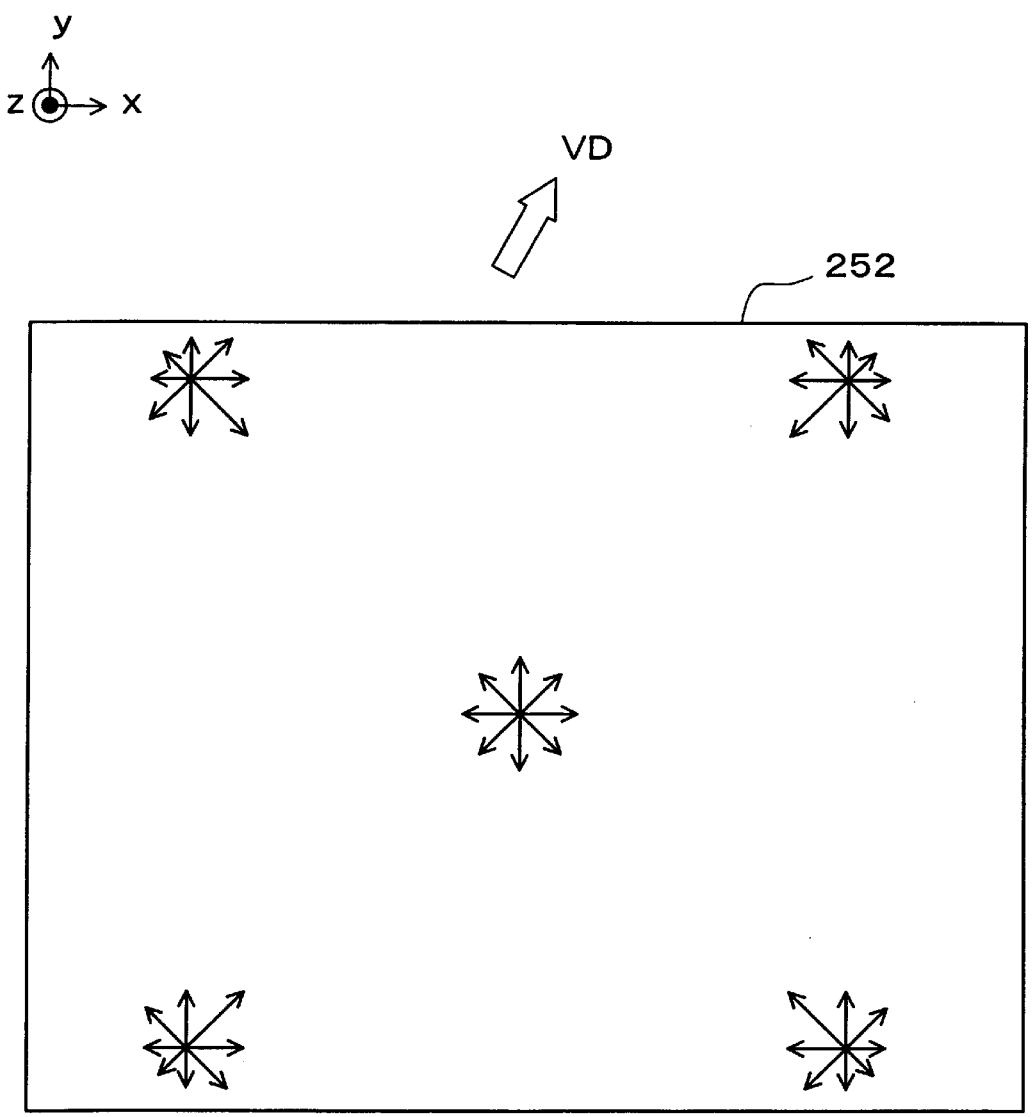
FIG. 10 is a drawing illustrating an example of the angular distribution of incident light on a light valve 252.

FIG. 10 illustrates an example of the angular distribution of incident light on the light valve 252. The arrows indicate the direction of the light and the size of the arrows indicate the light intensity. The angular distribution of incident light in the vicinity of the center of the light valve 252 is substantially uniform, but as the distance from the center increases, the intensity of light oriented toward the center of the light valve tends to rise.

FIGS. 11(A-1) through 11(B-2) are diagrams illustrating the contrast and the brightness of image displayed by the light valves 250, 252 and 254 of the projection display apparatus 10D, having the angular distribution of the incident light shown in FIG. 10. The light valves 250, 252 and 254 all use the same liquid crystal device 80.

Even when the angular distribution of the light varies as shown in FIG. 10, the contrast of images displayed by the three light valves still shows an improvement over a conventional apparatus. However, as shown in FIG. 11(A-1), the contrast in the case of the light valve 252 used to handle green (G) differs depending on the position of the light valve pixel. That is, if the contrast in the center of the light valve is taken as Medium, it is High at the lower left and Low at the upper right. The upper left and lower right are also Medium. Also, when the red (R) light and blue (B) light valves 250 and 254 are illuminated and the green (G) light valve 252 is illuminated, left-right contrast levels become virtually reversed along the center axis of the light in the vertical direction (y axis). This is caused by the fact that with respect to the cross dichroic prism 260, the plane of incidence of light exiting from the light valves 250, 252 and 254 is arranged so as to be perpendicular to the center axis 266 of the cross dichroic prism 260 in the direction of the y axis. Another factor is that the number of times light from the illumination system 100 is reflected between the illumination system 100 and each of the light valves is different for each light valve. Because of this, as shown by FIG. 11(A-2), in terms of left-and-right sides of the screens along the y axis (the vertical direction), the contrast distribution of the red and blue light valves 250 and 254 is the opposite to that of the green light valve 252. This can result in non-uniformity contrast of images projected on the screen SC.

When a white image is displayed, the brightness of light exiting the green light valve 252 can vary within the plane of the light valve, as shown by FIG. 11(B-1). That is, if the brightness in the vicinity of the center of the light valve is taken as Medium, the lower left is Bright and the upper right is Dark. Also, the upper left and lower right are Medium. On the other hand, as shown in FIG. 11(B-2), the brightness of light exiting the red and blue light valves 250 and 254 shows the same characteristics as in the case of contrast. That is, in terms of left-and-right sides of the screens along the y axis, the brightness distribution of the red and blue light valves 250 and 254 is the opposite to that of the green light valve 252. Thus, while the brightness in the lower left part of the green light valve 252 is Bright, in the red and blue light valves 250 and 254 the brightness of the light at the lower left is Medium. This can result in non-uniformity of brightness and colors in images projected on the screen SC.

Non-uniformity of brightness and colors can also arise during black screen display. The brightness distribution characteristics of the light valves 250, 252 and 254 during black screen display are opposite to those during white screen display. That is, a brightness level that is Bright during white screen display will be Dark during black screen display. Thus, the nature of the brightness and color non-uniformity arising during black screen display differs from that arising during white screen display.

In the case of the projection display apparatus 10E according to the fifth embodiment, when the angular distribution of the illumination light varies, non-uniformity in the contrast, brightness and colors of images projected on the screen SC can be reduced, as follows.

FIGS. 12(A-1) through 12(B-2) are diagrams illustrating the contrast and the brightness of image displayed by the light valves 250E, 252E and 254E of the projection display apparatus 10E, having the angular distribution of the incident light shown in FIG. 10. The light valves 250E, 252E and 254E all use the same liquid crystal device 80C. In the case of these three light valves 250E, 252E and 254E the micro-lenses 830M are offset only vertically, that is, only in a direction parallel to the center axis 266 of the cross dichroic prism 260 (FIGS. 8(A) and 8(B)). In the case of the projection display apparatus 10E, even when there is the type of differences in the angular distribution of the light shown in FIG. 10, as shown in FIGS. 12(A-1) and 12(A-2), the contrast distribution in the three light valves 250E, 252E and 254E can be reduced compared to the contrast distribution of the projection display apparatus 10D shown in FIGS. 11(A-1) and 11(A-2). Moreover, virtually the same can be achieved with respect to contrast distribution laterally across the screens of the three light valves 250E, 252E and 254E, thereby making it possible to reduce contrast non-uniformity in the direction.

Moreover, as shown by FIGS. 12(B-1) and 12(B-2), variation in the brightness distribution of light exiting the light valves 250E, 252E and 254E during white screen display can be reduced compared to the variation in brightness distribution of light exiting the projection display apparatus 10D, as shown in FIGS. 11(B-1) and 11(B-2). In addition, the brightness distribution of the three light valves during white screen display can be made substantially the same. During black screen display, too, brightness distribution can also be reduced and the brightness distribution of the three light valves made substantially the same. This makes it possible to reduce non-uniformity of screen colors and of lateral non-uniformity of brightness across the screens.

As shown in FIGS. 12(A-1) through 12(B-2), the contrast and brightness of the three light valves 250E, 252E and 254E relative to the clear viewing vector VD tend to be higher toward the lower side of the light valves and lower toward the upper side. In such cases, contrast, brightness, and color non-uniformity distribution can be made more even as described below.

Figure 13A:
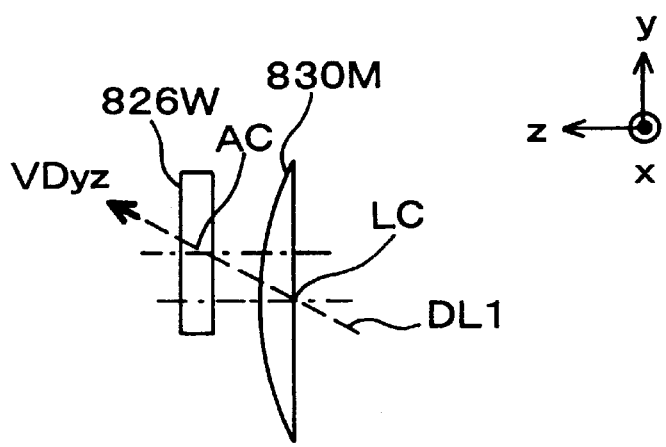
FIGS. 13(A) through 13(C) are diagrams illustrating the positional relationship between the micro-lens 830M and opening 826W of a liquid crystal device 80D.
Figure 13B:
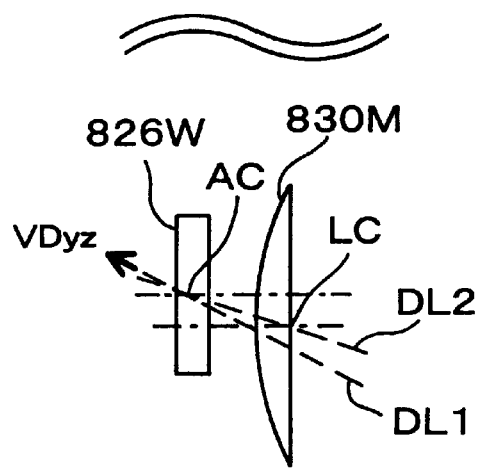
Figure 13C:
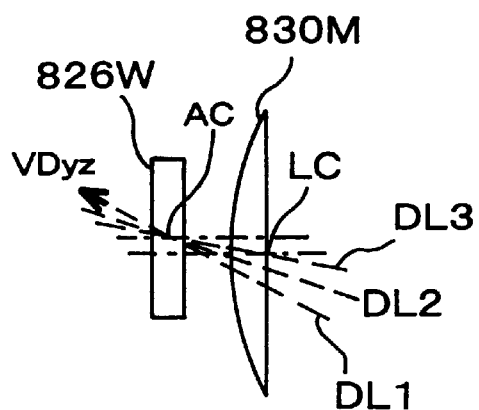

FIGS. 13(A) through 13(C) are diagrams illustrating the positional relationship between the micro-lens 830M and opening 826W of a liquid crystal device 80D. In FIGS. 13(A) through 13(C), the liquid crystal device 80D is shown from the side (along the x axis). The liquid crystal device 80D is divided into three pixel groups along direction y, each having a different positional relationship between micro-lens 830M and opening 826W. In the top pixel group, as shown in FIG. 13(A), the micro-lens 830M is located at a position that relative to the center axis of the corresponding opening 826W is offset in a negative direction along the y axis so that a line DL1 connecting center LC on the optical axis of the micro-lens 830M with the center AC on the center axis of the opening 826W is substantially parallel to the vector component VDyz of the clear viewing direction vector VD in plane yz.

In the center pixel group, as shown in FIG. 13(B), the micro-lens 830M is located at a position that is offset from the center axis of the opening 826W so that a line DL2 connecting the center LC on the optical axis of the micro-lens 830M with the center AC on the center axis of the corresponding opening 826W is inclined more toward the z axis than the vector component VDyz.

In the bottom pixel group, as shown in FIG. 13(C), the micro-lens 830M is located at a position that is offset from the center axis of the corresponding opening 826W so that a line DL3 connecting the center LC on the optical axis of the micro-lens 830M with the center AC on the center axis of the opening 826W is inclined more toward the z axis than the line DL2 in the case of the middle pixel group.

Thus, when the contrast and brightness of the three light valves 250E, 252E and 254E relative to the clear viewing direction (clear viewing vector) VD tend to be higher toward the lower side of the light valves and lower toward the upper side, contrast, brightness, and color non-uniformity distribution can be made more even as described in the above.

The liquid crystal devices 80C and 80D have been described with reference to micro-lens 830M being offset relative to the center axis of the opening 826W in the negative direction of y vector component VDy representing the clear viewing direction vector VD (FIGS. 8 and 13). However, the micro-lens 830M can also be offset from the center axis of the opening 826W in the negative direction of the x vector component VDx. Doing this would still allow the contrast, brightness, and color non-uniformity distribution to be decreased. Concerning whether the micro-lens 830M is to be offset relative to the center axis of the opening 826W in the negative direction of y vector component VDy representing the clear viewing direction vector VD or in the negative direction of the x vector component VDx, from the standpoint of contrast, it is preferable for the micro-lens 830M to be offset in the direction of whichever has a larger negative direction. While the above explanation was made with reference to the micro-lens 830M being offset along the cross dichroic prism center axis 266 in the direction of the x axis, in terms of uniformity of contrast, brightness and color, it is preferable for the micro-lens 830M to be offset in the negative direction of the clear viewing vector component VDx.

The liquid crystal device 80D was described with reference to its division into three pixel groups in the direction of the y axis. However, it is to be understood that the invention is not limited thereto. Instead, the division into pixel groups as well as the positional relationship between micro-lens 830M and opening 826W can be adjusted according to the degree of change in the contrast or brightness of the light valves.

Also, the fifth embodiment was described using as an example a projection display apparatus that uses three liquid crystal devices 80C or 80D to display color images. However, the projection display apparatus can be configured using one liquid crystal device 80C or 80D, as in the first three embodiments. Such a configuration will still enable non-uniformity in the contrast, brightness or colors of the displayed images to be decreased.

The above embodiments have been described with reference to the use of eccentric lenses consisting of micro-lenses, and to adjusting the positioning of the micro-lenses. However, an arrangement can be used whereby the refractive index is modified according to the point of light incidence in the micro-lens. That is, a configuration can be used that allows the characteristics of the micro-lenses to be adjusted with the aim of increasing the proportion of light exiting the pixels that is substantially parallel to the clear viewing direction of the liquid crystal device.

To facilitate explanation of the above embodiments, only the structural elements required for the explanation were shown. However, the invention is not limited thereto. For example, depending on the assembly mounting state of the elements, guide devices such as reflecting mirrors and the like can be provided between the elements. Also, while the above embodiments were described with reference to the use of an optical integrator to form the illumination system, an illumination system can be used that does not use an optical integrator.

The foregoing embodiments were described with reference to the use of non-polarized light for illumination. However, the apparatus may be equipped with a polarizing apparatus that is used to linearly polarize the light that is used. Using linearly polarized light that can be transmitted by a polarization plate provided at the entrance to the liquid crystal device would make it possible to prevent light loss, thereby improving the light utilization efficiency of the projection display apparatus.

The embodiments have been described with reference to the example of a projection display apparatus. However, a direct view display apparatus can be used as the liquid crystal device of this invention.

It should be clearly understood that the above embodiments are only illustrative and not restrictive in any sense. The scope and spirit of the present invention are limited only by the terms of the appended claims.

What is claimed is:

1. A liquid crystal device that modulates light in accordance with supplied image information, comprising:
   a plurality of pixels arranged in a matrix, each pixel having an opening to allow passage of light; and
   a micro-lens array that has a plurality of micro-lenses arranged in a matrix that divides illumination light into a plurality of partial light beams and converges the light to a light incidence plane of the pixels,
   wherein the liquid crystal device has a predetermined clear viewing direction which gives a maximum contrast, and
   wherein characteristics of micro-lenses are adjusted to increase a proportion of light exiting from the opening of each pixel substantially parallel to the clear viewing direction of the liquid crystal device compared to a proportion of light parallel to other directions.

2. A liquid crystal device according to claim 1, wherein the micro-lenses are formed as concentric lenses and are each positioned so that an optical center thereof is offset from a center axis of each pixel to increase a proportion of light exiting from the opening of each pixel substantially parallel to the clear viewing direction of the liquid crystal device compared to the proportion of light parallel to the other directions.

3. A liquid crystal device according to claim 2, wherein a position of the optical center of each micro-lens is set so that a line connecting the optical center of each micro-lens with the center of the opening of each pixel is substantially parallel to the clear viewing direction.

4. A liquid crystal device according to claim 1, wherein each micro-lens is formed so that a geographical center of the micro-lens is offset from an optical center of the micro-lens to increase the proportion of light exiting from the opening of each pixel substantially parallel to the clear viewing direction of the liquid crystal device compared to the proportion of light parallel to the other directions.

5. A liquid crystal device according to claim 4, wherein the optical center of each micro-lens is offset from the geographical center of the micro-lens to increase the proportion of light exiting from the opening of each pixel substantially parallel to the clear viewing direction of the liquid crystal device compared to the proportion of light parallel to the other directions.

6. A liquid crystal device according to claim 4, wherein the optical center of the micro-lens is located on a center axis of the corresponding pixel of the micro-lens.

7. A liquid crystal device that modulates light in accordance with supplied image information, comprising:

a plurality of pixels arranged in a matrix, each pixel having an opening to allow passage of light; and a micro-lens array that has a plurality of micro-lenses arranged in a matrix that divides illumination light into a plurality of partial light beams and converges the light to a light incidence plane of the pixels, wherein the liquid crystal device has a predetermined clear viewing direction which gives a maximum contrast, and wherein, taking x, y, z as axes set at right-angles to one another and z as being parallel to a center axis of light exiting the plurality of pixels, each micro-lens is formed as a concentric lens, and when a clear viewing vector representing the clear viewing direction of the liquid crystal device is broken down into a y vector component and an x vector component, an optical center of each micro-lens is offset from the center axis of the opening of the pixel in a negative direction along a selected one of the y vector component and x vector component.

8. A liquid crystal device according to claim 7 wherein the plurality of pixels are classified into a plurality of pixel groups, the liquid crystal device being characterized in that the optical center of the micro-lenses is offset from the center axis of the pixel opening by an amount that is different in each pixel group.

9. A projector for projecting an image, comprising:

a liquid crystal device that modulates light in accordance with supplied image information;

an illumination system that projects illumination light at the liquid crystal device; and an optical projection system for projecting modulated light exiting from the liquid crystal device, wherein the liquid crystal device has a predetermined clear viewing direction which gives a maximum contrast, and wherein the liquid crystal device comprises:

a plurality of pixels arranged in a matrix, each pixel having an opening to allow passage of light; and a micro-lens array that has a plurality of micro-lenses arranged in a matrix that divides illumination light into a plurality of partial light beams and converges the light to a light incidence plane of the pixels, wherein characteristics of micro-lenses are adjusted to increase a proportion of light exiting from the opening of each pixel substantially parallel to the clear viewing direction of the liquid crystal device compared to a proportion of light parallel to other directions.

10. A projector display apparatus according to claim 9, wherein the micro-lenses are formed as concentric lenses and are each positioned so that an optical center thereof is offset from a center axis of each pixel to increase a proportion of light exiting from the opening of each pixel substantially parallel to the clear viewing direction of the liquid crystal device compared to the proportion of light parallel to the other directions.

11. A projector display apparatus according to claim 10, wherein a position of the optical center of each micro-lens is set so that a line connecting the optical center of each micro-lens with the center of the opening of each pixel is substantially parallel to the clear viewing direction.

12. A projector display apparatus according to claim 10, wherein the light illumination system that projects illumination light at the liquid crystal device is disposed so that a center axis direction of the illumination light is substantially parallel to the clear viewing direction.

13. A projector display apparatus according to claim 9, wherein each micro-lens is formed so that a geographical center of the micro-lens is offset from an optical center of the micro-lens to increase the proportion of light exiting from the opening of each pixel substantially parallel to the clear viewing direction of the liquid crystal device compared to the proportion of light parallel to the other directions.

14. A projector display apparatus according to claim 13, wherein the optical center of each micro-lens is offset from the geographical center of the micro-lens to increase the proportion of light exiting from the opening of each pixel substantially parallel to the clear viewing direction of the liquid crystal device compared to the proportion of light parallel to the other directions.

15. A projector display apparatus according to claim 14, wherein the optical center of the micro-lens is located on a center axis of the corresponding pixel of the micro-lens.

16. A projector display apparatus according to claim 9, further comprising:

a color separator that separates the illumination light into a plurality of colors;

a plurality of the liquid crystal devices to receive each of the plurality of colors into which the light is separated by the color separator; and a color combiner for combining light of the colors exiting the plurality of liquid crystal devices, wherein combined light exiting the color combiner is projected by the projection display apparatus via the optical projection system.

17. A projector for projecting an image, comprising:

a liquid crystal device that modulates light in accordance with supplied image information;

an illumination system that projects illumination light at the liquid crystal device; and an optical projection system for projecting modulated light exiting from the liquid crystal device, wherein the liquid crystal device has a predetermined clear viewing direction which gives a maximum contrast, and wherein the liquid crystal device comprises:

a plurality of pixels arranged in a matrix each pixel having an opening to allow passage of light; and a micro-lens array that has a plurality of micro-lenses arranged in a matrix that divides illumination light into a plurality of partial light beams and converges the light to a light incidence plane of the pixels, wherein, taking x, y, z as axes set at right-angles to one another and z as being parallel to a center axis of light exiting the plurality of pixels, each micro-lens is formed as a concentric lens, and when a clear viewing vector representing the clear viewing direction of the liquid crystal device is broken down into a y vector component and an x vector component, an optical center of each micro-lens is offset from the center axis of the opening of the pixel in a negative direction along a selected one of the y vector component and x vector component.

18. A projector display apparatus according to claim 17, wherein the plurality of pixels are classified into a plurality of pixel groups, the liquid crystal device being characterized in that the optical center of the micro-lenses is offset from the center axis of the pixel opening by an amount that is different in each pixel group.

19. A projector display apparatus according to claim 17, further comprising:

a color separator that separates the illumination light into a plurality of colors;

a plurality of the liquid crystal devices to receive each of the plurality of colors into which the light is separated by the color separator; and a color combiner for combining light of the colors exiting the plurality of liquid crystal devices, wherein combined light exiting the color combiner is projected by the projection display apparatus via the optical projection system.

20. A projector display apparatus according to claim 19, wherein each micro-lens is disposed with the optical center of the micro-lens offset from the center axis of the opening of the pixel along one of the y vector component and x vector component of the clear viewing direction in a negative direction that is parallel to a direction perpendicular to a plane of incidence of light of each color that exits from the plurality of liquid crystal devices into the color combiner.

* * * * *